United States Patent [19]
Parsons

[11] Patent Number: 5,564,533
[45] Date of Patent: Oct. 15, 1996

[54] WET DISC BRAKE HAVING A PAD WITH GROOVES

[76] Inventor: Francis E. Parsons, 21 Brittannia Street, West Geelong, Victoria 3215, Australia

[21] Appl. No.: 211,577

[22] PCT Filed: Oct. 9, 1992

[86] PCT No.: PCT/AU92/00540

§ 371 Date: Apr. 11, 1994

§ 102(e) Date: Apr. 11, 1994

[87] PCT Pub. No.: WO93/07402

PCT Pub. Date: Apr. 15, 1993

[30] Foreign Application Priority Data

Oct. 11, 1991 [AU] Australia .................................. PK8867
Jun. 25, 1992 [AU] Australia .................................. PL3155

[51] Int. Cl.⁶ .............................. F16D 55/02; F16D 69/00
[52] U.S. Cl. .................................................. 188/250 E
[58] Field of Search .......................... 188/7.16, 250 R, 188/261, 250 E, 264 R, 264 B, 264 D, 264 E, 73.36, 73.37, 367, 250 B, 250 G, 73.1, 73.2, 71.4

[56] References Cited

U.S. PATENT DOCUMENTS

| | | | |
|---|---|---|---|
| 1,890,425 | 12/1932 | Whitworth | 188/250 R |
| 2,163,884 | 6/1939 | Brie | 188/261 X |
| 2,799,367 | 7/1957 | Dotto | 188/250 R |
| 4,030,185 | 6/1977 | Hahm et al. | 188/250 R X |

FOREIGN PATENT DOCUMENTS

| | | |
|---|---|---|
| B153857 | 4/1952 | Australia . |
| B14317/55 | 6/1956 | Australia . |
| B17988/56 | 11/1956 | Australia . |
| B16400/62 | 10/1963 | Australia . |
| B43652/85 | 1/1986 | Australia . |
| 61107 | 9/1982 | European Pat. Off. . |
| 486772 | 5/1992 | European Pat. Off. . |
| 1014836 | 8/1952 | France .............................. 188/250 R |
| 2539557 | 3/1977 | Germany . |
| 57-94139 | 6/1982 | Japan . |
| 63-190938 | 8/1988 | Japan . |
| 1124004 | 8/1968 | United Kingdom . |
| 2184179 | 6/1987 | United Kingdom . |

*Primary Examiner*—Robert J. Oberleitner
*Assistant Examiner*—Peter M. Poon
*Attorney, Agent, or Firm*—Banner & Allegretti, Ltd.

[57] ABSTRACT

The present invention relates to a brake assembly and a pad configuration for use therein which is capable of use in corrosive environments without significant damage occurring to the assembly from such usage. The assembly comprises a single disc, a housing surrounding the disc which together with rotary seals provides a substantially sealed zone within which an annular braking surface of the disc rotates, and at least one friction pad having a friction surface adapted to be moved against the braking surface to provide a braking effect. The friction surface has a leading edge which is swept or angled rearwardly from a radial line passing through an inner leading edge corner of the friction surface and one or more grooves which are open at both ends and which are also angled rearwardly from a radial line passing through an inner forward end of each groove.

8 Claims, 8 Drawing Sheets

WET DISC BRAKE HAVING A PAD WITH GROOVES

The present invention relates to improvements in disc brake assemblies and components therefore, particularly, but not exclusively, for use in light utility motor vehicles.

Conventional light utility motor vehicles now find a ready application in personnel transportation roles on and around mine sites where brake housings and components are likely to be splashed with or completely immersed in highly corrosive liquors. Other situations also exist where vehicle wheels and brake assemblies are likely to come into contact with corrosive liquors such as operation in or around sea or salt water. In these and other comparable applications, many components do not provide low maintenance and reliability which is usual in on-highway use. This is due to the severity of conditions encountered both on the sites and on the service roads accessing the mines and in the other applications.

The environmentally exposed dry friction brakes of the type employed on marketplace light utility vehicles are substantially affected by operating condition effects. Abrasive dusting on roads, and frequent inundation in water and mud on the actual sites bring about both high parts wear rates and parts corrosion. On those sites where dissolved salts and dissolved minerals are present in ground water, brake attrition by corrosion can be so severe that it produces unacceptable safety hazards.

Since the trackless vehicle mining concept has become commonplace, multi-plate oil immersed friction brakes have been widely employed to isolate vehicle braking systems from environmental damage. The multi-plate type brake has the drawback that it requires quite different mount spaces to conventional dry friction brakes and utilizes different activation systems. The multi-plate enclosed brake system is thus only suitable for custom designed machines where wheel disc shapes, wheel stud arrangements, hub dimensions and brake actuation systems can be chosen during the design stage to provide for multiple plate brakes requirements. Multi-disc brakes also have the disadvantage that, without severe modifications, only one brake effect system can be used per wheel. That is, with individual or separate pads, two or more pad pairs can be used per wheel with at least one pair being operated from an independent actuation system to act as an emergency brake. Furthermore, multi disc brake assemblies require that the softer faced composite (or friction material) discs be rotated so as to assist cooling because of oil circulation difficulties as a result of the tightly packed stack of discs. Thus, the oil also needs to be pumped over or through the metal pans. This difficulty does not occur with single disc/discrete pad arrangements because a much more favorable heat sink results from the use of a thicker metal disc and natural even heat transfer because the metal disc is rotated. As a result of the foregoing, even when designed as original equipment, multi disc brakes tend to be for more complicated and expensive than a single metal disc brake with opposed pairs of friction pads.

The introduction of non-specialized marketplace vehicles equipped with environment exposed single disc (or drum) dry friction brake systems was done to lower the cost of personnel transportation within and around mines. An important aspect of the use of these low cost vehicles is that they can be resold after an appropriate service cycle to recover part of the capital expenditure.

The retrofitment of any brake system on such vehicles cannot thus require extensive vehicle modifications or it defeats the reason for using common marketplace vehicles in the first instance. In essence, whatever brake mount space is available on the corporate produced marketplace vehicles and the wheel studding configuration, the application system must be retained to satisfy the market dictates.

The net effect of the above clearly sets design parameters for a retrofittable product. A brake system suitable for retrofitment to light utility type marketplace motor vehicles should preferably achieve or at least approach the following desirable aspects:

1. Need only the slightest vehicle axle modifications which can be reversed at a later date.
2. Fit into the brake space provided by the original manufacturer and bolt to existing structures.
3. Utilize higher performance coulombic type friction.
4. As far as possible, provide equivalent braking performance to that offered by the OEM brakes when brand new.

In the original equipment market (OEM) there is also a need for an environmentally friendly brake system which minimizes or entirely prevents the discharge of friction material dust into the atmosphere as the pad material wears during use. This of course applies whether the brake system is to be used on a vehicle that will be used in corrosive environments or simply on normal on road vehicles which will not normally suffer corrosive use environments. It is of course desirable also that such brake systems should not be significantly more expensive than conventional existing dry brake systems and in fact significantly less expensive than existing wet or oil immersed systems such as the multi-disc systems discussed above. A significant reason for the low cost of dry friction brakes is that they utilize coulombic friction whereas wet disc brakes use viscous shear which produces only about one fifth of the torque per unit area. Commercially available oil immersed multi-disc brakes require substantially different mount arrangements to that of conventional dry friction brakes and in fact are more complicated and expensive. This means that conventional multi-plate oil immersed wet disc brake designs as marketed today are not suitable for after market application to common marketplace light utility type motor vehicles nor are they desirable for use as original equipment on such vehicles if a cheaper, simpler and equally effective system exists.

Thus, an objective of the present invention is to provide a brake system for vehicles generally and those specific vehicle types discussed above which may be of a similar configuration to the standard dry brake equipment currently supplied with the vehicle at manufacture but which is capable of operation in harsh and corrosive environments with satisfactory life and operational characteristics. A further preferred objective is to provide a brake system which reduces wear of friction material and minimizes the atmospheric discharge of friction material dust while still being simple in construction and effective in operation. A still further preferred objective is to provide an improved brake pad design adapted to improve braking performance in a liquid medium, and more preferably by utilizing coulombic type function characteristics despite the liquid medium.

According to a first aspect of the present invention there is provided a brake pad configuration for use in a brake assembly and adapted to apply brake effect to a rotatable disc, said brake pad configuration having a leading edge, a trailing edge and a radially inner edge and a radially outer edge defining a friction surface therebetween, said brake pad configuration being characterized by at least one groove extending inwardly from said friction surface, each said groove extending between either said leading edge or said radially inner edge and either said radially outer edge or said trailing edge, each said groove at said leading edge or said radially inner edge, in use, extending rearwardly from a radial line at an acute angle at each point along their length.

In one specific embodiment of this aspect of the present invention, the brake pad configuration has a leading edge, a trailing edge and a radially inner edge and a radially outer edge defining a friction surface therebetween. In this embodiment, the brake pad configuration is characterized by a plurality of grooves extending inwardly from said friction surface with each said groove having opposed ends opening respectively onto one of said edges of the brake pad configuration, at least one of said grooves extending between said leading edge and said radially outer edge with further said grooves extending between either said leading edge or said radially inner edge and either said radially outer edge or said trailing edge, each of said grooves in use, extending rearwardly from a radial line at an acute angle at each point along their length.

Conveniently, each said groove extends in a substantially continuous straight or curved line. Advantageously, the leading edge of the pad is swept or angled rearwardly from a radial line passing through an inner leading corner of the pad. Preferably, the rear edge of each groove is perpendicular to the pad braking surface or is angled rearwardly (relative to the leading edge) by an angle within the range of 0 to 30 degrees. Advantageously, the density or number of grooves in a zone adjacent the leading edge is greater than the density or number of grooves in a zone adjacent the trailing edge of the pad. The arrangement of the grooves as described above assists in removal of liquid from the braking surface of the rotor as it is engaged by the pad during a braking operation.

The present invention provides a disc brake assembly for a vehicle adapted to be connected to an axle end, said assembly comprising a single rotor disc adapted to rotate with said axle end and a stationary housing enclosing said rotor with one or more seals acting to provide a substantially sealed zone surrounding at least a braking effect region of said rotor disc, at least one friction pad incorporating a brake pad configuration as defined above pad located adjacent a braking surface of said rotor disc in said braking effect region with each said friction pad being arranged to move axially towards and engage said braking surface of the rotor disc or to move axially away and disengage from braking effect on said rotor disc, and liquid filling means provided to permit at least part of said zone surrounding said rotor disc to be filled with a liquid medium. Conveniently, the disc brake assembly, in use, is filled to a level at least above each said rotary seal. Conveniently, said assembly comprises at least one pair of said friction pads with at least one said friction pad of a said pair of pads being positively moveable towards said rotor disc during a braking operation. In this manner, the use of a single rotor disc together with one or more pairs of friction pads conforms the brake system to a configuration compatible with an original dry disc vehicle brake assembly. The liquid filling means permits the enclosed zone to be filled with liquid to an extent that will effectively prevent ingress of dust or corrosive liquors through the rotary seals which is the primary source of entry of such contaminations. The liquid medium also minimize the production of friction material dust particles and the rotary seals prevent or minimize the escape of any such particles to the atmosphere. The liquid also provides a cooling effect to the brake components but as will be readily appreciated, a detrimental effect will result on the friction or braking characteristics of the assembly due to the liquid medium causing brake couple separation and filling rotor face asperities with a practically incompressible medium.

A number of features or steps may be used individually, or in any combination, to improve the friction or braking characteristics of the assembly. One such proposal is to place at least one friction pad pair no lower than a horizontal line through the axis of rotation of the rotor disc. Preferably, at least one friction pad pair may be located, at least partially, in a forward upper quadrant of the rotor disc having regard to the normal forward direction of the vehicle. While these arrangements are not critical, they do assist with braking performance although satisfactory operation is possible with other physical locations. Of course additional pad pairs might be used as desired. In a particularly preferred embodiment, a leading edge of each friction pad is swept or angled from a radially inner leading corner rearwardly from a radial line passing through the radially inner leading corner of the pad having regard to the direction of rotation of the rotor disc. Conveniently, operating means is provided associated with each said friction pad that is positively moved towards the braking surface of the rotor disc during a braking operation, the operating means being adapted to provide increased pressure against the leading edge of the friction pad during the braking operation relative to the pressure applied to the remainder of the friction pad. This is believed to provide an improved removal of liquid (or oil) from the area of the pad via the leading edge pressing closely against the rotor disc, particularly where the leading edge of the pad is swept or angled rearwardly as discussed above. The aforementioned operating means is conveniently at least two operating pistons acting on the friction pad, with one of said pistons acting at least closely adjacent to or partially overlying the leading edge of the friction pad with the other piston (or pistons) being distributed rearwardly therefrom. In a still further preferred aspect, grooves are provided in the friction surface of the friction pad extending to a depth equivalent to an acceptable safe working level of the friction material such that the grooves will exist over the full operational life of the pad. Preferably each groove is square edged and is angled rearwardly either parallel to the leading swept or angled edge of the pad or angled at an acute angle relative to the leading edge of the pad. Each groove is preferably, continuous, i.e. without any discontinuities in line or curve, and extends from the radial inner circumference of the pad either to the radial outer circumference of the pad or the trailing edge of the pad. Preferably, the grooves are about 2 mm wide and about 5 mm deep although other sized grooves are beneficial but not necessarily as efficient.

Conveniently, the rear edge of each groove (relative to the leading edge of the pad) is either perpendicular to the friction material surface or is angled rearwardly from the perpendicular. The angle from the perpendicular is preferably in the range of 0° to 30°, preferably about 15°. Conveniently, the density or number of the grooves is relatively greater towards the leading edge of the pad as compared to the number of grooves towards the trailing edge of the pad.

In a further aspect, the present invention also provides a brake pad configuration wherein a leading edge of the pad is swept or angled rearwardly from a radial line passing through an inner leading corner of the pad.

Several preferred embodiments of the present invention will hereinafter be described with reference to the accompanying drawings, in which:

FIGS. 11A and 11B are partial section views of two different possible groove shapes taken along lines XI—XI of FIGS. 7 to 10.

Figure 1:
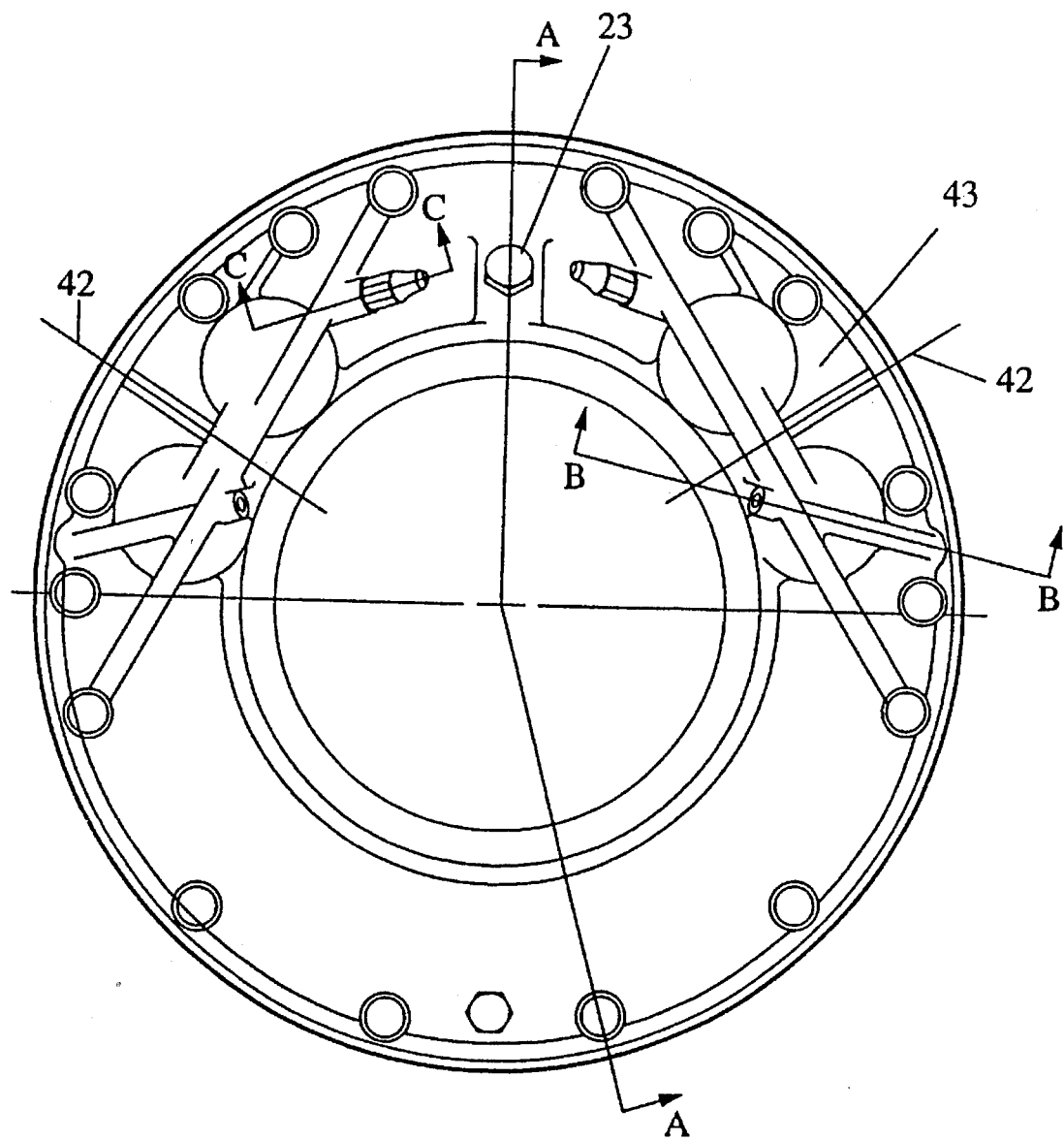
FIGS. 1 and 2 are elevation views of two alternative brake configurations according to the present invention.
Figure 3:
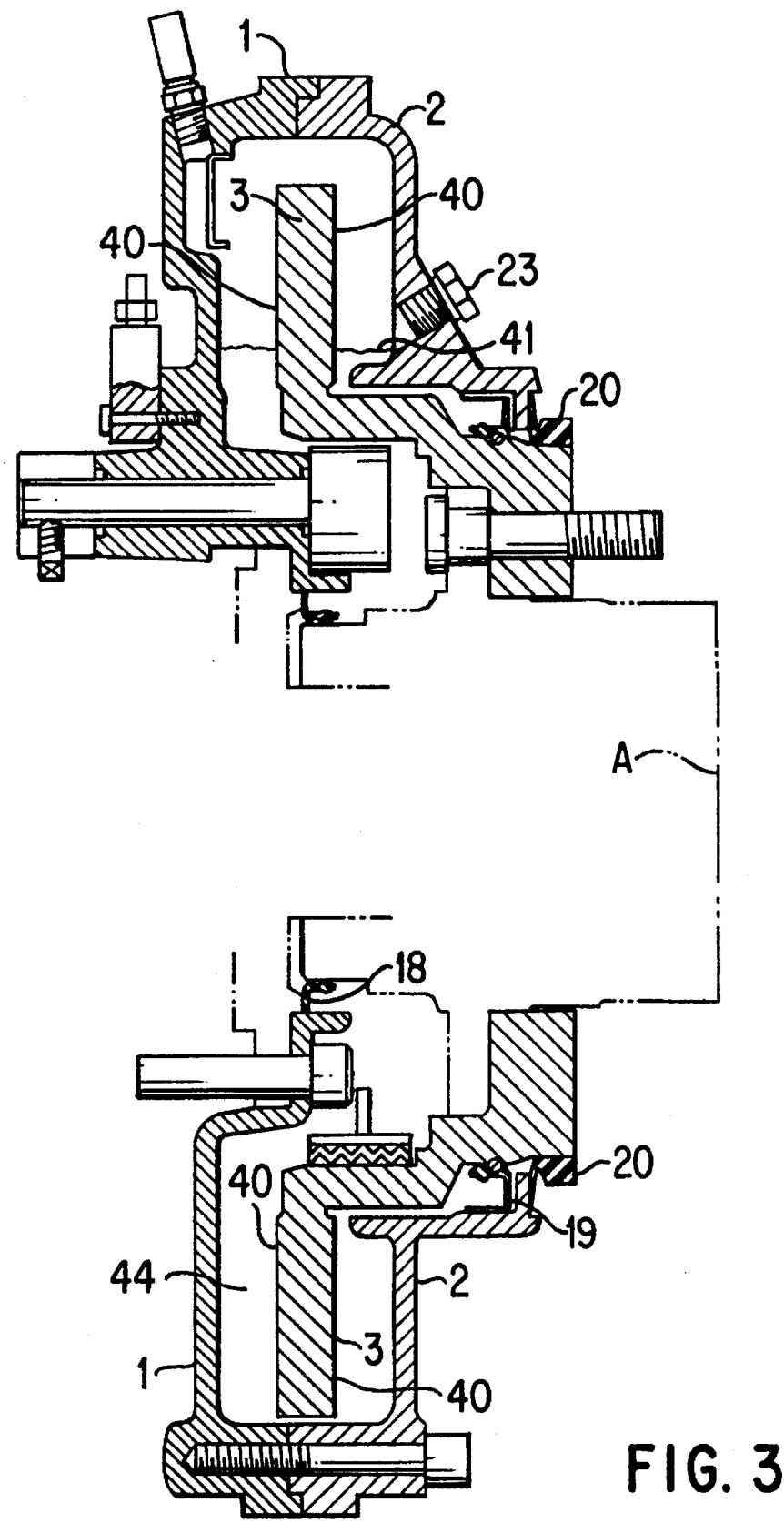
FIG. 3 is a partial sectional view along line A—A of FIG. 1.
Figure 4:
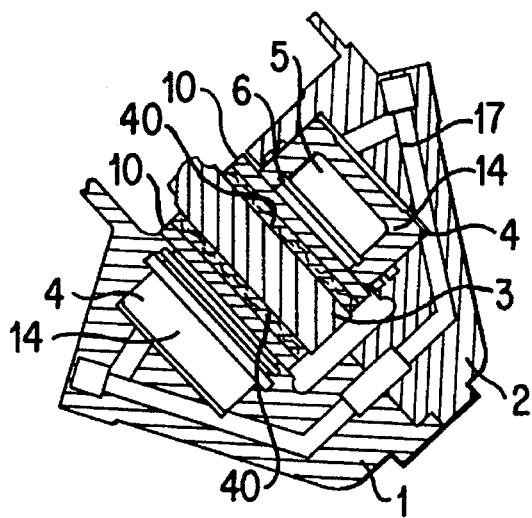
FIG. 4 is a partial sectional view along line B—B of FIG. 1.
Figure 5:
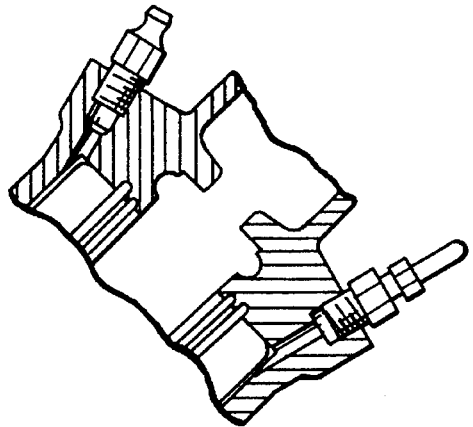
FIG. 5 is a partial sectional view along line C—C of FIG. 1.

As shown in FIGS. 1 and 3, the brake assembly according to this preferred embodiment comprises a rotor disc 3 secured to an axle end A via bolts. The radially outer circumferential section of the disc 3 has opposed annular braking surfaces 40 against which one or more individual brake pads 10 can be engaged. An operating mechanism 4 is provided for each pad intended to be positively moved against a respective one of the braking surfaces 40. The operating mechanism may comprise a pair of piston members 14 adapted to be moved by hydraulic pressure applied through passages 17 to outer faces of the piston members. Seals 5,6 may be provided in the walls of the cylinder spaces in which the piston members 14 move (FIG. 4). The operating mechanism in this embodiment comprises a pair of piston members 14 circumferentially spaced along the pad 10—as best indicated in FIG. 1. As shown in FIG. 1, the radial center lines 42 of the pad operating mechanisms 4 may be located in the upper half of the housing 2 and more preferably at least one of the pad pairs is located in the forward upper quadrant 43. A housing, split into two halves 1, 2, is provided surrounding the hub and disc 3 providing a substantially enclosed sealed zone 44, the zone being sealed by rotary seals 18, 19 and 20. An access opening is provided releasably closed by a plug 23 enabling liquid oil to be filled into the zone 44. The liquid level may be located as at 41, so that the rotary seals 18,19 and 20 always have liquid on the inside thereby preventing ingress of contaminants therethrough and also preventing the escape of dust contaminants therefrom.

Figure 2:
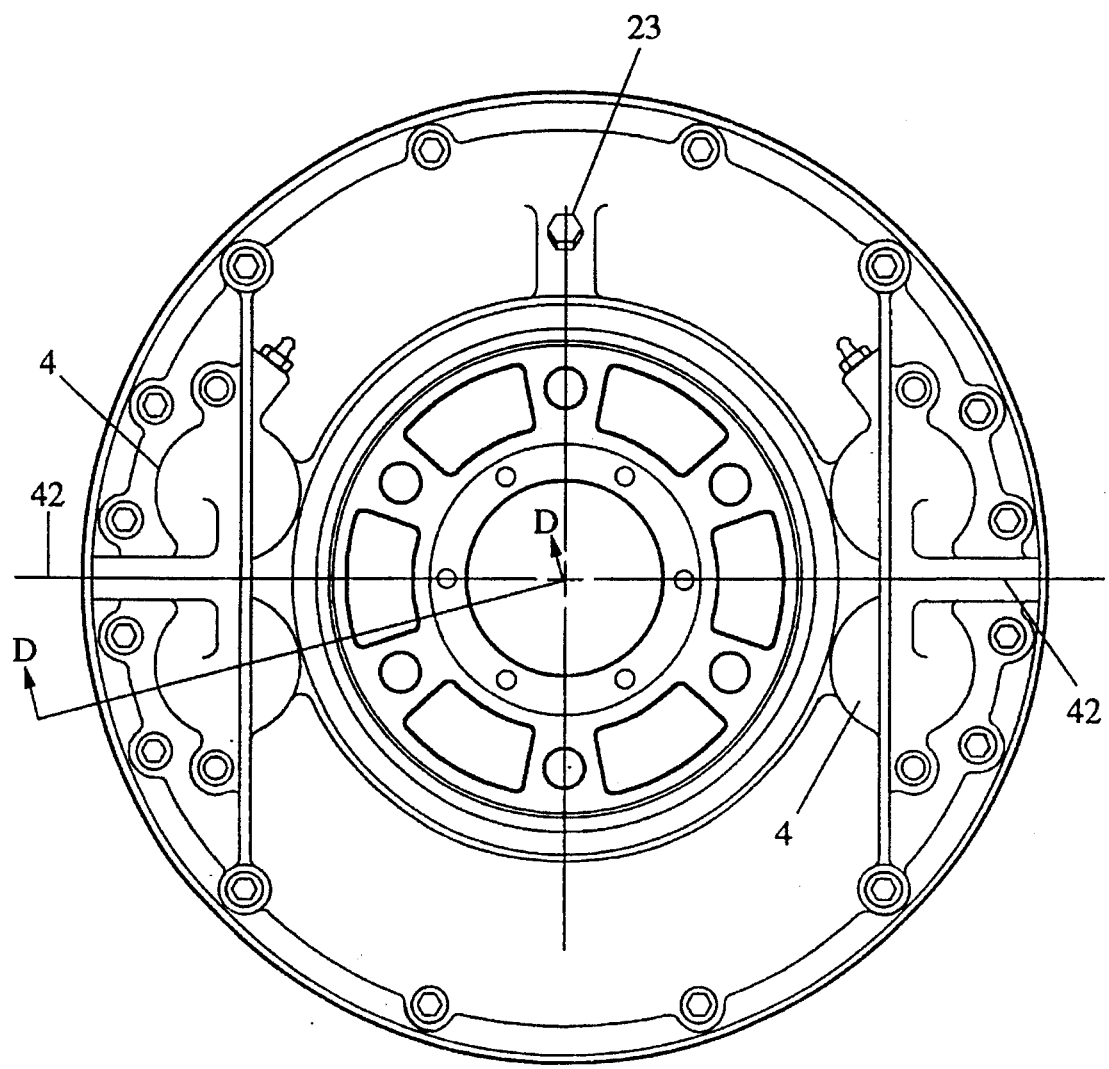
Figure 6:
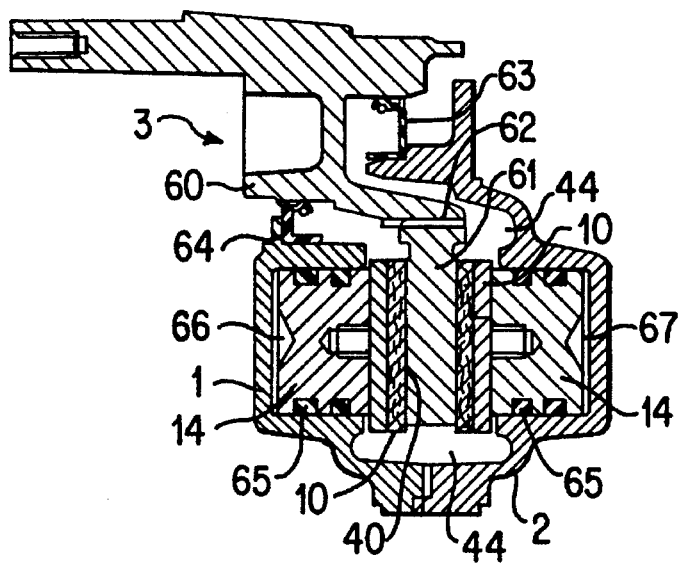
FIG. 6 is a partial sectional view along line D—D of FIG. 2.
Figure 7:
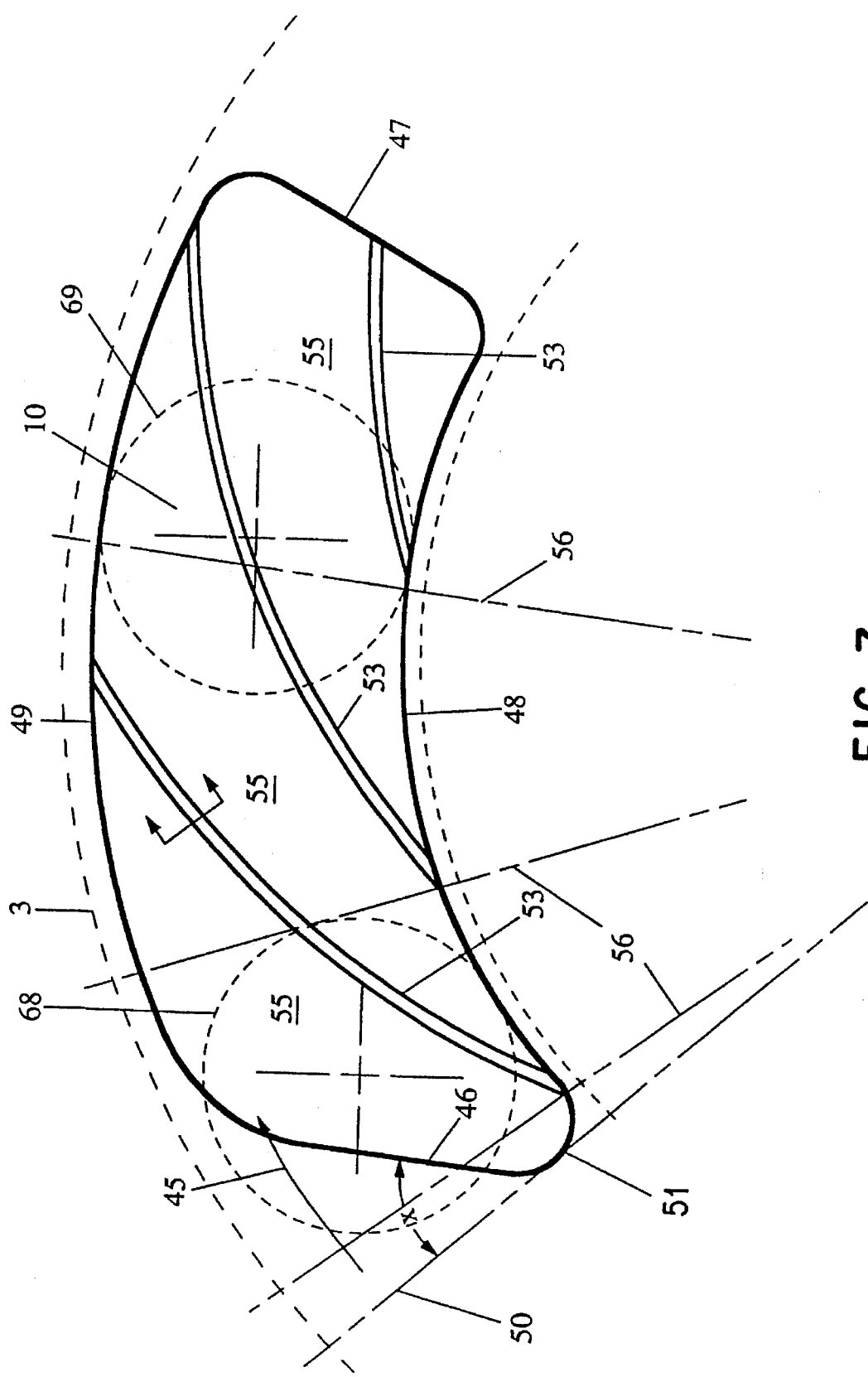
FIGS. 7 to 10 are schematic views of differing friction pad configurations according to preferred embodiments of the present invention.

FIGS. 2 and 6 illustrate a second preferred embodiment where like features have been given the same reference numbers as in FIGS. 1 and 3 to 5. In this embodiment two pairs of friction pads are provided with the pairs being arranged on diametrically opposed sides of the assembly. The embodiment allows only one pair of friction pads to be operably employed if satisfactory braking characteristics can be obtained thereby.

In this embodiment the hub and disc 3 is made in two parts, a first inner section or hub 60 being adapted to be bolted or otherwise secured to an axle end and a second outer section (the disc) 61 is connected to the inner section 60 by a spline connection 62. The outer section 61 of the rotor disc has opposed annular braking surfaces 40 adapted to be engaged by friction pads 10. The splined connection enables the outer section 61 of the rotor disc (which is the part subject to wear) to be easily removed for repair or replacement. Other forms of connection between the inner and outer parts could be used if desired, however, the splined connection 62 also has the advantage of enabling the outer section 61 to move axially so that only one positive operating mechanism 4 could be used for each pair of pads 10. It is, however, preferred that two such operating mechanisms 4 be employed, each of which includes a pair of piston members 14.

The assembly also includes a pair of housing pans 1,2 defining a zone 44 in which the outer rotor section 61 rotates. The zone 44 is sealed by rotary seals 63,64 acting between the rotating inner section 60 of the rotor and the stationary housing parts 1,2. The piston members 14 of each operating mechanism are located in one of the housing parts 1 or 2. Normally, with hydraulically operated brake assemblies (e.g. dry friction brakes), some form of positive return mechanism is required to move the piston members a significant distance away from the rotor disc when braking is not required. This is achieved via appropriate return springs, hydraulic means or by arranging angled annular seal rings in the wall of the piston cylinder which have the desired return effect when braking effect hydraulic pressure is released from the pistons. In the present invention, however, because the brake pads are effectively operating within a bath of liquid oil, the piston members do not have to move a significant distance away from the rotor disc when braking effect is not required. As is shown in FIG. 6, piston sealing rings 65 may be provided in the piston members 14 rather than the cylinder walls and via this arrangement, sufficient movement is achieved away from the rotor disc 3 when hydraulic pressure is removed from the spaces 66,67 as a result of braking effect no longer being required. Appropriate hydraulic fluid connections (not shown) would of course be provided to the spaces 66,67 to allow brake activating pressure fluid to be delivered thereto or to be removed therefrom when braking effect is not required.

Provision is also made in the embodiment of FIGS. 2 and 6 to fill or partially fill the zone 43 with liquid oil, for example, via the port closed by plug 23.

Figure 8:
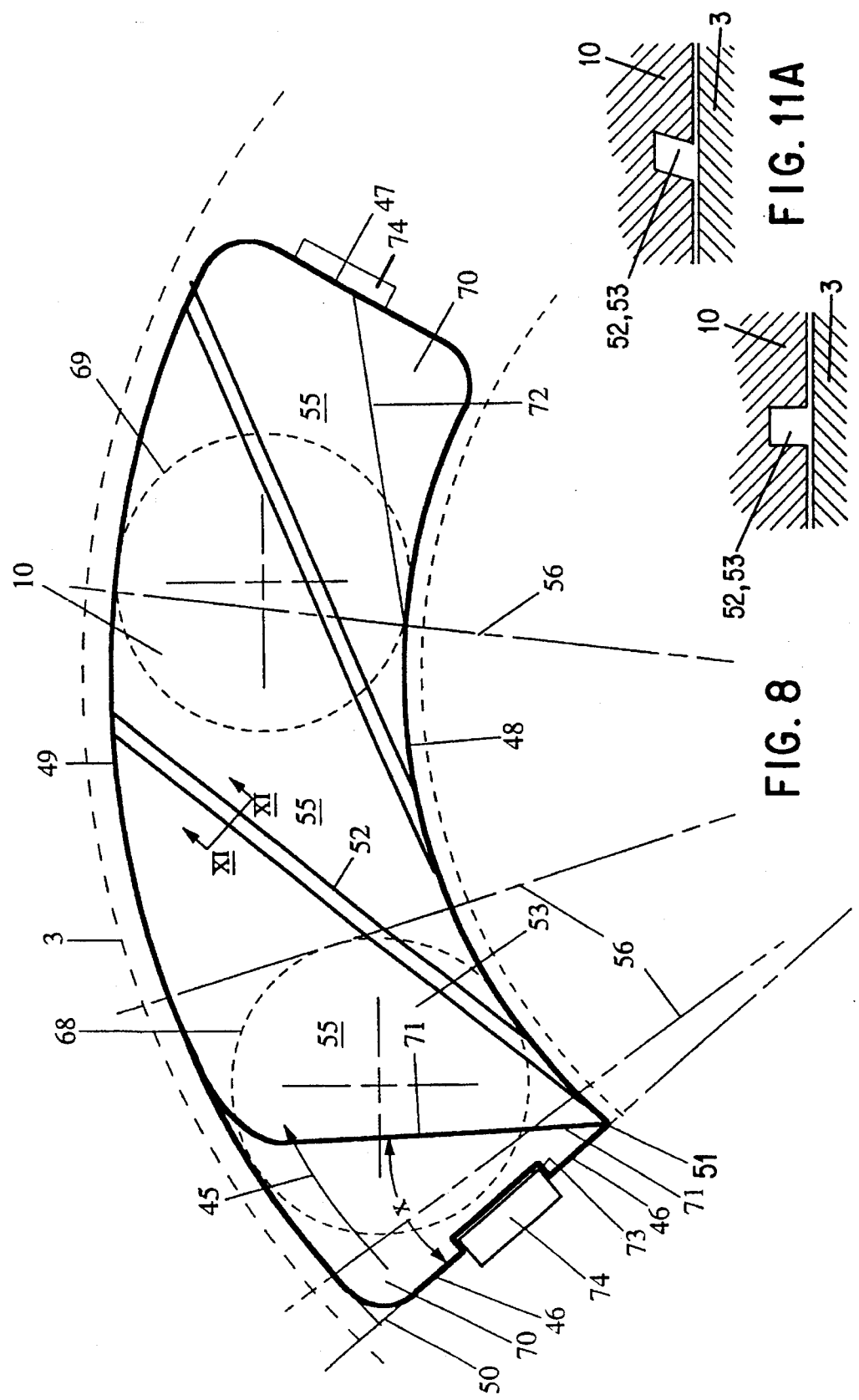
Figure 9:
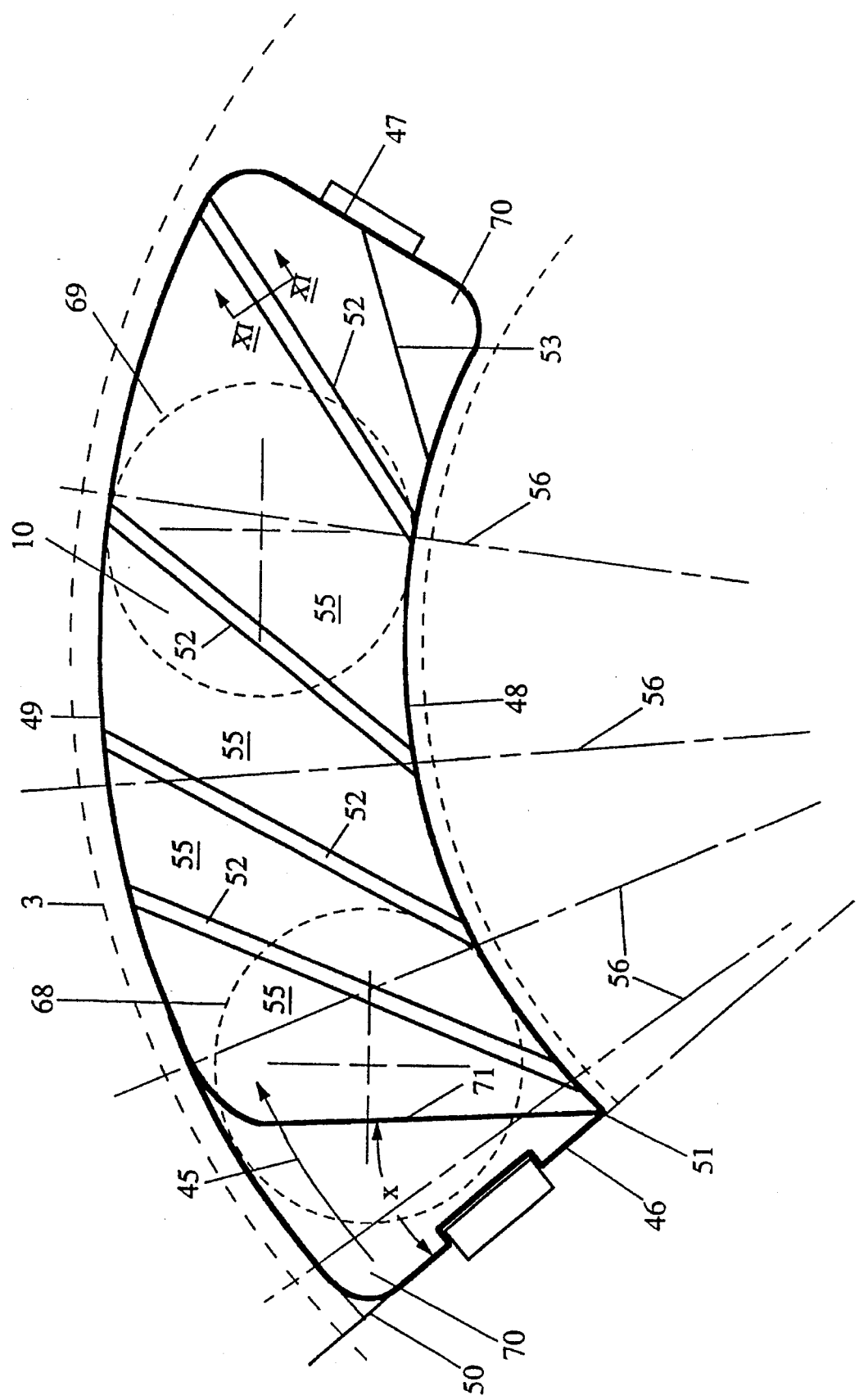
Figure 10:
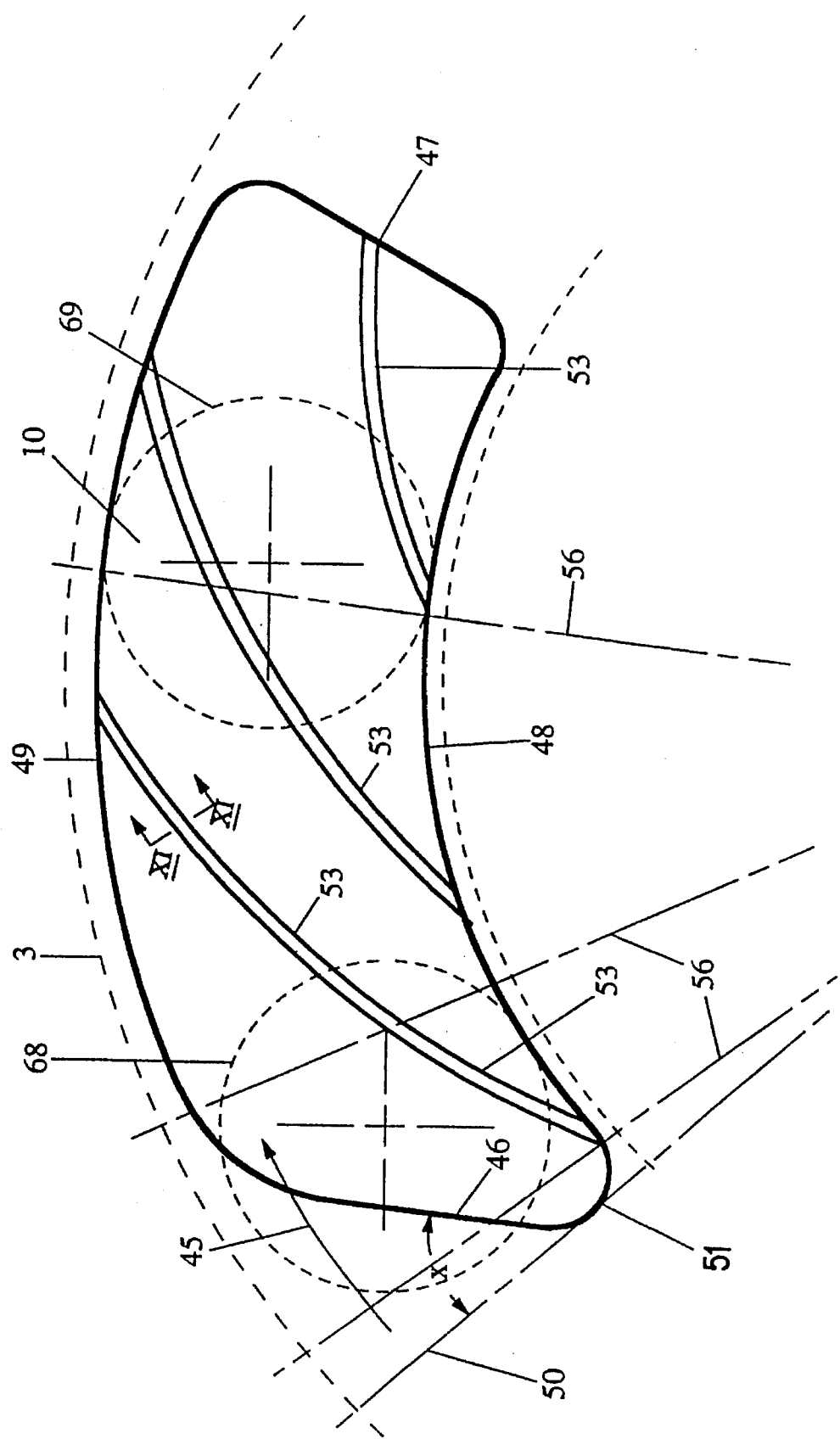

FIGS. 7 to 10 illustrate several preferred forms of pad construction comprised of a desired friction material. In each Figure the dotted outline represents the rotor 3 and the arrow 45 represents the direction of rotation of the rotor 3 past the pad 10. The pad has a leading edge 46, a trailing edge 47, an inner circumferential edge 48 and an outer circumferential edge 49. The leading edge 46 is swept in a continuous curve or straight line rearwardly at an acute angle x to a radial line 50 passing through the inner leading corner 51 of the pad. As shown in FIGS. 8 and 9, the front edge of the friction material 55 as opposed to the backing plate 70 may be angled as aforesaid rearwardly. It is preferred that the forward angled edge 71 of the friction material extend from the forward inner corner 51 as illustrated. Further, the rear inner corner of the friction material may be removed as illustrated along an angled line 72. Preferably the forward edge 46 of the backing plate 70 is notched at 73 to receive the pad anchor 74 thereby preventing incorrect installation of the pad. If desired, in this arrangement, the grooves could also be curved as in FIGS. 7 and 10. The various arrangements disclosed angling rearwardly the front edge of the friction material has the effect of acting to direct oil film from the rotor surface outwardly away from the pad to minimize its effect on frictional characteristics. If desired a wiper element might be added in front of this leading edge to further limit the effect of this oil film on frictional characteristics. This effect may be improved by ensuring the operating mechanism 4 applies a greater pressure to the leading edge 46 relative to the trailing edge 47. The dotted outlines 68,69 schematically represent the positioning of the operating pistons 14. As shown, the location 68 of the forward piston 14 is partially over the leading edge 46 to relatively increase the pressure thereon. In addition, this effect might be improved by angling the leading edge rearwardly by an angle between 0 and 30 degrees from the perpendicular to the rotor disc braking surfaces 40. A series of grooves 52, 53 may be provided, preferably as illustrated extending from the pad edge 48 to either of the pad edges 49 or 47. Again the intention is to direct liquid oil through the grooves outwardly and away from the friction surface 55 of the pad. The grooves may be straight as shown at 52, or curved as shown at 53, and each preferably forms an acute angle with radial lines 56 at the inner edge 48. These acute angles are preferably equal to or greater than the angle x and preferably increase in a direction from the leading edge 46 to the rear edge 47. As shown in FIGS. 9 and 10, it is preferred that the number of grooves per unit area in a forward zone of the pad be greater than that in a rearward zone of the pad. Again this is believed to improve the removal of liquid oil from the braking surfaces. As shown in FIGS. 11A and 11B, the cross-sectional shape of the grooves 52,53 may be square edged, however, it is preferred that the trailing edge of each groove be perpendicular to the braking surface or be angled rearwardly as illustrated in FIG. 11A. The angle to the perpendicular may be from 0 to 30 degrees, preferably, about 15 degrees. The depth of the grooves should be sufficiently deep to exist operably over the complete working life of the pad. The rear edge of the or each groove should be a substantially sharp edge, i.e. not with a radius or bevel.

I claim:

1. A discrete brake pad configuration for use in a brake assembly and adapted to apply brake effect to a rotatable disc, said brake pad configuration having a leading edge, a trailing edge and a radially inner edge and a radially outer edge defining a friction surface therebetween, said brake pad configuration being characterized by a plurality of grooves extending inwardly from said friction surface with each said groove having opposed ends opening respectively onto one of said edges of the brake pad configuration, at least one of said grooves extending between said leading edge and said radially outer edge with further said grooves extending between either said leading edge or said radially inner edge and either said radially outer edge or said trailing edge, each of said grooves in use, extending rearwardly from a radial line at an acute angle at each point along their length.

2. A brake pad configuration according to claim 1 wherein a trailing edge of each said groove forms an angle to said friction surface between 60 and 90 degrees.

3. A brake pad configuration according to claim 1 or claim 2 wherein each said groove is curved in a continuous rearwardly angled arc.

4. A brake pad configuration according to claim 1 wherein the spacing between said grooves in a first zone adjacent the leading edge of the pad configuration is less than the spacing between the grooves in a second zone adjacent said trailing edge of the pad configuration.

5. A brake pad configuration according to claim 1 wherein said leading edge is swept or angled rearwardly from a radial line passing through an inner leading corner region of the brake pad configuration.

6. A brake pad configuration according to claim 1 wherein each said groove is between 2 and 5 millimeters wide.

7. A brake pad configuration according to claim 1 wherein each said groove has a depth sufficient to ensure that the groove remains operationally effective over a safe working life of the brake pad configuration.

8. A brake friction pad including a brake pad configuration mounted on a discrete support plate, wherein said brake pad configuration is adapted to apply brake effect to a rotatable disc, wherein said brake pad configuration has a leading edge, a trailing edge and a radially inner edge and a radially outer edge defining a friction surface therebetween, and further wherein said brake pad configuration is characterized by a plurality of grooves extending inwardly from said friction surface with each said groove having opposed ends opening respectively onto one of said edges of the brake pad configuration, at least one of said grooves extending between said leading edge and said radially outer edge with further said grooves extending between either said leading edge or said radially inner edge and either said radially outer edge or said trailing edge, each of said grooves in use, extending rearwardly from a radial line at an acute angle at each point along their length.

* * * * *